May 29, 1956 D. NEWLAND 2,747,522
MACHINE FOR MAKING AN EDIBLE PRODUCT
Filed June 22, 1953 3 Sheets-Sheet 1
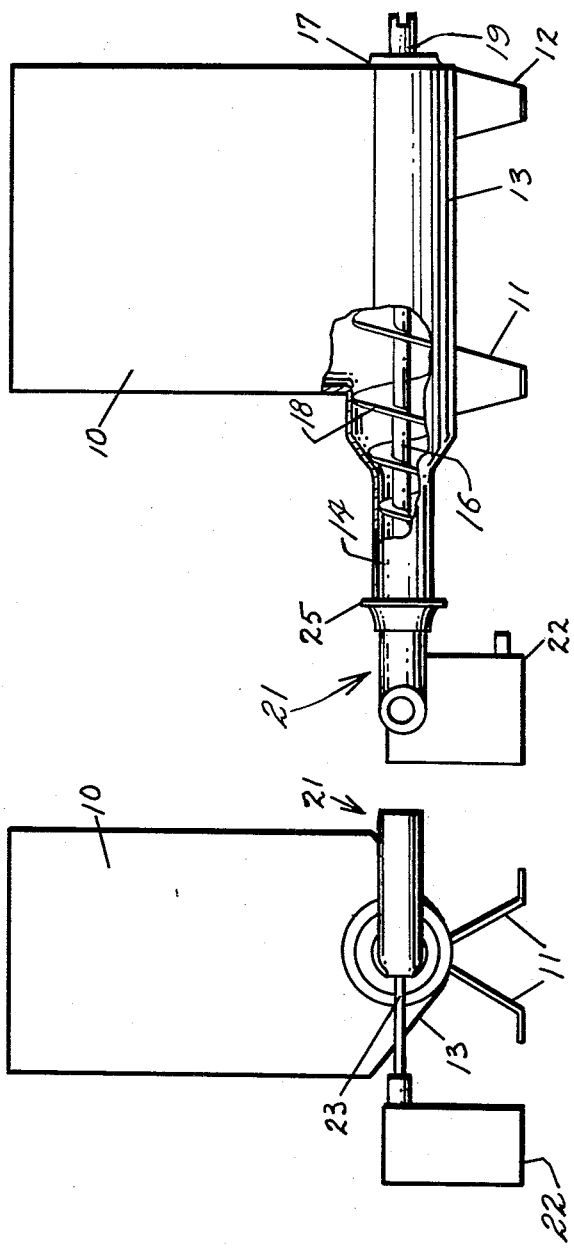
DIETZ NEWLAND INVENTOR.
BY *Marvin Moody*
ATTORNEY May 29, 1956 D. NEWLAND 2,747,522
MACHINE FOR MAKING AN EDIBLE PRODUCT
Filed June 22, 1953 3 Sheets-Sheet 2

DIETZ NEWLAND INVENTOR.

BY *Marvin Moody*

ATTORNEY

May 29, 1956  D. NEWLAND  2,747,522
MACHINE FOR MAKING AN EDIBLE PRODUCT
Filed June 22, 1953  3 Sheets—Sheet 3

DIETZ NEWLAND  INVENTOR.

BY *Marvin Moody*

ATTORNEY

United States Patent Office 2,747,522
Patented May 29, 1956

2,747,522

MACHINE FOR MAKING AN EDIBLE PRODUCT

Dietz Newland, Cedar Rapids, Iowa

Application June 22, 1953, Serial No. 363,329

3 Claims. (Cl. 107—1)

This invention relates in general to automatic machines and in particular to a machine for making an edible coated item.

My co-pending patent application entitled "Food Product and Process of Making the Same" filed on May 14, 1953, Serial Number 355,083, disclosed a food product which has an edible center surrounded by another edible material. An example given therein was a wiener covered by mashed potatoes. This is fried in deep fat until the potatoes are brown and makes a very palatable meal. The present invention relates to a machine for making these items.

It is therefore, a principal object of this invention to disclose a machine for making edible items.

Yet another object of this invention is to produce composite food items with a firm edible center covered by a softer edible layer.

Yet another object of this invention is to provide a machine which is capable of producing uniform edible articles.

A feature of this invention is to provide a machine, which will have a hopper for holding a soft edible covering material, a mechanism for feeding the covering to a nozzle, concentric with and surrounding a tube in which a plunger operates for pushing an edible center therethrough, so that the center will receive a covering of the edible material as it is pushed out of the nozzle.

Further objects, features and advantages of this entire invention will become apparent from the following description and claims when read in view of the drawings, in which:

Figure 1 is a cut-away side view of the machine of this invention;

Figure 2 is an end view of the machine;

Figure 3:
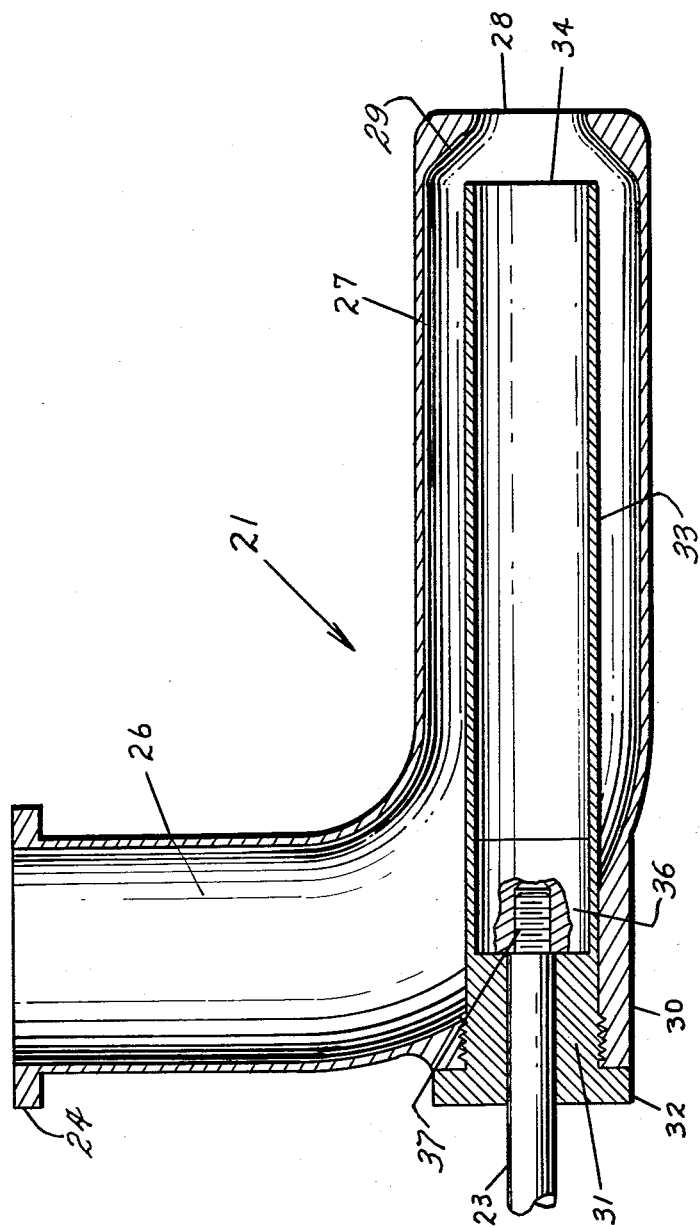
Figure 3 is an enlarged sectional view of the nozzle of this invention.

As described in my co-pending application on "Food Product and Process for Making the Same" which is referenced above, I have invented a new article of food which comprises an edible center surrounded by a softer edible substance. One example of the product is a wiener covered by mashed potatoes which may be fried to produce a delicious meal. One problem in making these items is to get the mashed potatoes to stick to the wiener. Another problem is to obtain a uniform coating so as to obtain an attractive product.

Figure 1 illustrates a hopper 10 which is supported upon legs 11 and 12. The lower portion 13 of the hopper has a tubular extension 14 at one end thereof.

Rotatably supported by the extension 14 and lower portion 13 is a shaft 16 which is mounted in a suitable bearing 17. A spiral feed 18 is mounted on the shaft 16 as shown in cut-away. One end 19 of shaft 16 extends from the hopper 10.

Attached to the end of extension 14 is a nozzle 21 which is shown in greater detail in Figures 3–6. A plunger drive mechanism 22 supports a shaft 23 for longitudinal movement for a purpose to be later described. The mechanism 22 might be a rack and pinion, for example.

The nozzle 21 is shown in section in Figure 3 and it is seen that a flange 24 is formed on one end of a first tubular portion 26. The nozzle 21 is attached to the end of extension 14 by a coupling 25 shown in Figure 1. It locks the flange 24 against the extension.

A second portion 27 is connected to the first portion 26 by an elbow. The end of portion 27 is formed with an opening which is smaller in diameter than the remainder of the tube. A fillet 29 is formed at the end of portion 27 to reduce the size of opening 28.

A straight portion 30 is connected to junction of portions 26 and 27 and threadedly receives a plug 31 which has a shoulder 32.

Plug 31 has a tubular member 33 attached thereto which extends within the portion 27 and terminates with an opening 34 adjacent the hole 28.

The shaft 23 is slidably received within plug 31 and carries a plunger 36 on its end 37. The plunger 36 may be moved through the member 33 and to extend partially out of the hole 28.

Figure 4:
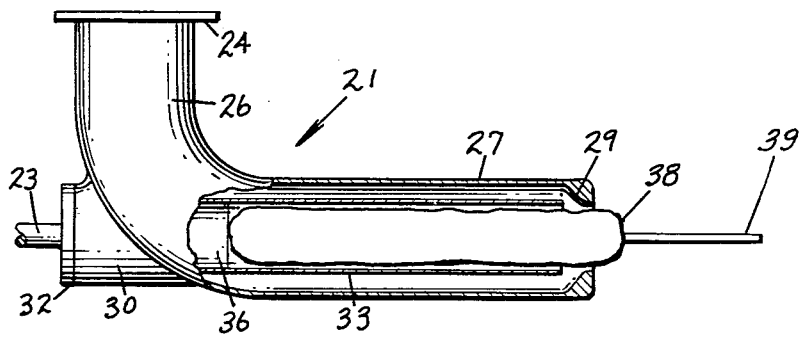
Figure 4 is a cut-away view of the nozzle with the edible center fully inserted.
Figure 5:
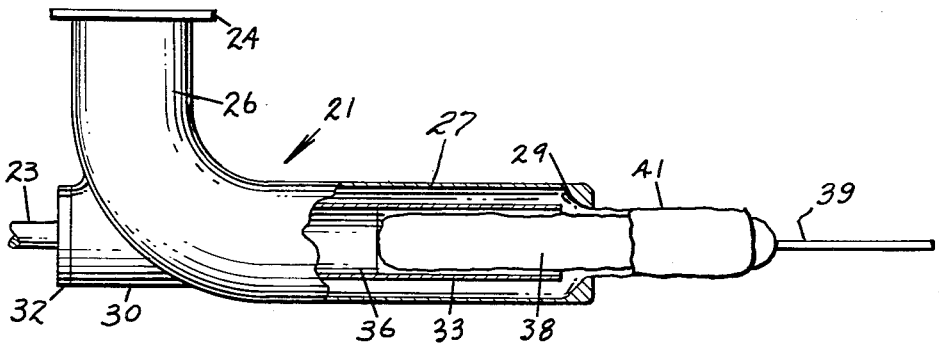
Figure 5 is a cut-away view of the nozzle with the edible center partially extruded; and, Figure 6 illustrates the nozzle with the food center ejected.
Figure 6:
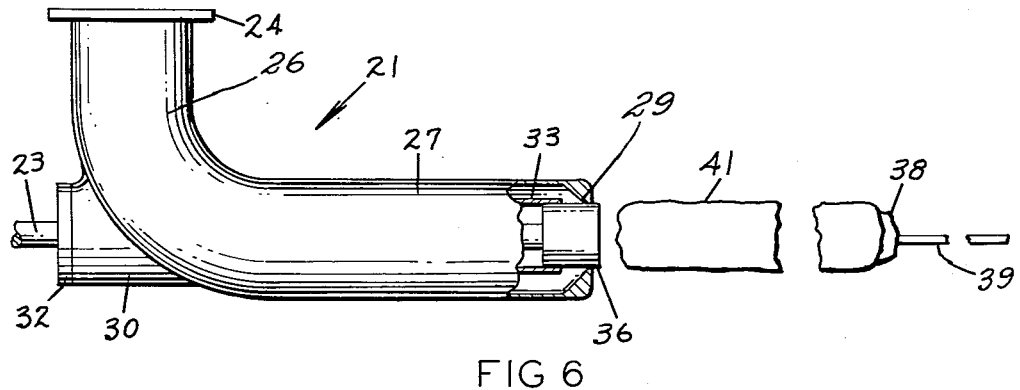

Figures 4, 5, and 6 illustrate the operation of the machine and show the relative positions of the various parts.

As shown in Figure 4 a wiener 38 mounted on a stick handle 39 may be manually inserted into tube member 33 with the plunger 36 in the retracted position.

Potatoes which have been mashed and prepared according to my co-pending application previously referred to are placed in hopper 10 and the shaft 19 is rotated by a suitable motor (not shown) or manually.

Simultaneously the plunger drive mechanism 22 is actuated to move the plunger 36 through the member 33. It is to be realized that the shaft 23 may be driven manually if desired.

The potatoes are extruded through the opening 28 by the spiral drive 18 and form a coating on the wiener 38 as it is moved by the plunger 36. The coating 41 is pressed onto the wiener by the fillet 29 which reduces the size of portion 27.

Figure 5 shows the coated wiener about half way out of the nozzle and it is seen that a uniform coating is obtained.

Figure 6 illustrates the nozzle after the plunger 36 has ejected the wiener and it is to be noted that the plunger 36 closes the opening 28. This prevents the potato from being ejected without the wiener.

The plunger 36 is then retracted by the mechanism 22 or manually and another wiener may be inserted and the process repeated. The distance from the plunger to the hole 28 when retracted should be approximately the length of the wiener.

It is seen that this invention provides a machine for producing a food product such as potato coated wieners. It is to be realized that other articles may be combined if desired.

Although this invention has been described with respect to a particular embodiment, it is not to be so limited as changes and modifications may be made therein which are within the full intended scope of the invention as defined by the appended claims.

I claim:

1. A combining machine for producing a food product with an edible center and an edible coating thereon comprising, a hopper with the edible coating therein, a tubular extension attached to the lower portion of the hopper, a first shaft rotatably supported in the tubular extension, a spiral feed attached to the first shaft, a ninety degree bend formed in the tubular extension, the end of the tubular extension reduced in cross-section, and a second tube extending through the tubular extension at said bend and terminating adjacent the end of the tubular extension.

2. In apparatus according to claim 1 a plunger mounted within the tubular member and movable to the end of the second tubular portion.

3. In apparatus according to claim 2, a drive mechanism attached to the plunger to move it relative to the tubular member.

References Cited in the file of this patent

UNITED STATES PATENTS

| | | |
|---|---|---|
| 651,829 | Copland | June 19, 1900 |
| 798,251 | Averay-Jones | Aug. 29, 1905 |
| 1,664,337 | Vanderput | Mar. 27, 1928 |
| 2,433,140 | McCaughey | Dec. 23, 1947 |
| 2,580,726 | Brewer | Jan. 1, 1952 |